(12) United States Patent
Bernier et al.

(10) Patent No.: US 10,583,598 B2
(45) Date of Patent: Mar. 10, 2020

(54) NOZZLE CONFIGURATION FOR PURGING FLOW CHANNEL

(71) Applicant: Synventive Molding Solutions, Inc., Peabody, MA (US)

(72) Inventors: Albert R. Bernier, Gloucester, MA (US); Salvatore A. LoGrasso, Beverly, MA (US); Vito Galati, Rowley, MA (US)

(73) Assignee: Synventive Molding Solutions, inc., Peabody, MA (US)

(*) Notice: Subject to any disclaimer, the term of this patent is extended or adjusted under 35 U.S.C. 154(b) by 194 days.

(21) Appl. No.: 15/672,380

(22) Filed: Aug. 9, 2017

(65) Prior Publication Data

US 2017/0334115 A1    Nov. 23, 2017

Related U.S. Application Data

(63) Continuation of application No. PCT/US2016/022452, filed on Mar. 15, 2016.

(60) Provisional application No. 62/133,589, filed on Mar. 16, 2015.

(51) Int. Cl.
| | |
|---|---|
| *B29C 45/76* | (2006.01) |
| *B29C 45/27* | (2006.01) |
| *B29C 45/26* | (2006.01) |
| *B29C 45/28* | (2006.01) |

(52) U.S. Cl.
CPC ........ *B29C 45/7613* (2013.01); *B29C 45/261* (2013.01); *B29C 45/278* (2013.01); *B29C 2045/2761* (2013.01); *B29C 2045/2767* (2013.01); *B29C 2045/2787* (2013.01);
(Continued)

(58) Field of Classification Search
None
See application file for complete search history.

(56) References Cited

U.S. PATENT DOCUMENTS

| | | | |
|---|---|---|---|
| 6,273,706 | B1 | 8/2001 | Gunther |
| 2007/0082083 | A1 | 4/2007 | Fairy |
| 2017/0334115 | A1* | 11/2017 | Bernier ................ B29C 45/278 |

FOREIGN PATENT DOCUMENTS

| | | | |
|---|---|---|---|
| DE | 29809855 | * | 8/1998 |
| DE | 29809855 | U1 | 8/1998 |

(Continued)

OTHER PUBLICATIONS

Office Action in corresponding European application No. 16715166.1 dated Jul. 26, 2018.
(Continued)

*Primary Examiner* — Nathan T Leong
(74) *Attorney, Agent, or Firm* — Polsinelli, PC

(57) ABSTRACT

An injection molding apparatus comprising: an injection molding machine, a heated manifold, a nozzle, the downstream end of the nozzle comprising an inner tubular member having a central flow channel and an outer circumferential surface and an outer tubular member having an inner tubular surface, the outer tubular member forming a seal surrounding the gate, the inner and outer tubular members being adapted to form a sealed circumferential gap, the inner tubular member including one or apertures extending radially through the inner tubular member to route flow radially from the fluid flow channel into the circumferential gap.

7 Claims, 9 Drawing Sheets

(52) U.S. Cl.
CPC .......... *B29C 2045/2862* (2013.01); *B29C 2045/2886* (2013.01); *B29C 2945/76568* (2013.01)

(56) References Cited

FOREIGN PATENT DOCUMENTS

| JP | 04-320820 | * 11/1992 |
| JP | H04320820 A | 11/1992 |

OTHER PUBLICATIONS

Office Action in corresponding European application No. 16715166.1 dated Feb. 5, 2019.
English translation of Office Action in corresponding Chinese application No. 2016800122453 dated Jan. 11, 2019.
English translation of Office Action in corresponding Chinese application No. 2016800122453 dated Jul. 30, 2019.
Notice of Intention to Grant in corresponding European application No. 16715166.1 dated May 23, 2019.
Int'l. Preliminary Report on Patentability dated Jun. 7, 2017 in Int'l. Appln. No. PCT/US2016/022452.
Int'l. Search Report and Written Opinion dated Jun. 22, 2016 in Int'l. Appln. No. PCT/US2016/022452.

* cited by examiner

NOZZLE CONFIGURATION FOR PURGING FLOW CHANNEL

RELATED APPLICATIONS

This application is a continuation of and claims the benefit of priority to PCT/US16/022452 filed Mar. 15, 2016 which claims the benefit of priority to U.S. Provisional Application Ser. No. 62/133,589 filed Mar. 16, 2015, the disclosures of both of which are incorporated by reference in their entirety as if fully set forth herein.

This application is a continuation of and claims the benefit of priority to International application serial no. PCT/US14/31000 filed Mar. 18, 2014 and is a continuation of and claims the benefit of priority to International application serial no. PCT/US14/52639 filed Aug. 26, 2014.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. Nos. 6,599,116, 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), U.S. application Ser. No. 10/101,278 filed Mar. 19, 2002 (7070) and international applications PCT/US2011/062099 and PCT/US2011/062096 and PCT/US2015/10270

BACKGROUND OF THE INVENTION

Injection molding systems having nozzle inserts and configurations that form circumferential gaps and pockets with the flow channel of the nozzle have been used in systems such as shown in PCT/US15/10270.

SUMMARY OF THE INVENTION

In accordance with the invention there is provided an injection molding apparatus comprising:

an injection molding machine 20, a heated manifold 30 that receives an injection fluid material 23 from the injection molding machine 20, a nozzle 50 having a fluid flow channel 300 having a longitudinal axis A and an upstream end 50u that receives the injection fluid material 23 from the heated manifold 30 and delivers the injection fluid to a downstream end 50d that sealably delivers the injection fluid 23 to a gate 85 of a cavity 80 of a mold body 88, the downstream end 50d of the nozzle 50 comprising an inner tubular member 55 having an outer circumferential surface 55es and an outer tubular member 56 having an inner tubular surface 56is, the outer tubular member 56 forming a seal 57, 86, 54, 58 surrounding the gate 85, the inner 55 and outer 56 tubular members being adapted to form a sealed circumferential gap G between the outer circumferential surface 55es of the inner tubular member 55 and the inner circumferential surface 56is of the outer tubular member 56, the circumferential gap G circumferentially surrounding the fluid flow channel 300, the inner tubular member 55 including one or apertures 500 extending radially R through the inner tubular member 55 between the fluid flow channel 300 and the circumferential gap G to enable flow of injection fluid 23 that is injected in an upstream to downstream path of flow through the fluid flow channel 300 to flow radially R from the fluid flow channel 300 into the circumferential gap G. The circumferential gap G is preferably adapted to route the flow of injection fluid downstream to the mold cavity 80.

The circumferential gap G and the fluid flow channel 300 are preferably adapted to communicate with each other downstream to form a common stream of flow 23c and route the injection fluid material 23 to the gate 85.

The one or more apertures 500 are preferably configured to direct or route injection fluid 23 that is injected from the upstream end of the nozzle downstream through the fluid flow channel 300 and radially R and longitudinally A through the circumferential gap G.

The apparatus typically further comprises a controller 16 having a program that contains instructions that control axial positioning of an outer surface 90tcs, 90mds of the valve pin 90 relative to an inner surface 55is of the inner tubular member 55 to form a flow restriction UG through the nozzle channel 300 for one or more predetermined amounts of time during the course of an injection cycle sufficient to cause flow of fluid material 23 to be routed through an aperture 500 at an elevated rate of flow (GF) through the purge apertures (500) and the gap (G).

The one or more apertures 500 typically have a flow axis AA that is configured and disposed at an acute angle X to the longitudinal axis A of the fluid flow channel 300 of the nozzle 50 that is adapted to route the injection fluid 23 radially R in a downstream axial A direction through the gap G toward the gate 85.

The inner tubular member 55 is preferably mounted within and circumferentially surrounded by the outer tubular member 56 at the distal end of the nozzle 50d, the inner tubular member having an outer circumferential mating surface 54 that is sealably engaged against an inner seal surface 58 of the outer tubular member 56 to seal against upstream flow of the injection fluid material 23 through the gap G.

The outer tubular member 56 preferably has an exterior seal surface 57 sealably engaged against a mold body seal surface 86 to seal against upstream flow the injection fluid material through the gap G.

The inner tubular member 55 preferably mounted and nested within the outer tubular member 56 in an arrangement that seals injection fluid material against upstream flow through the gap G.

The apparatus can further comprise a controller 16 containing instructions that direct withdrawal of the valve pin 90 upstream from a gate closed position at one or more reduced rates of travel relative to a maximum rate of travel upstream to one or more partially gate open positions.

And the controller 16 can contain instructions that direct withdrawal of the valve pin 90 from a gate closed position upstream to one or more partially gate open positions that restrict fluid material 23 flow to a rate less than a maximum rate for one or more predetermined periods of time and subsequently upstream to a fully gate open position.

In another aspect of the invention there is provided a method of purging the injection nozzle of an apparatus as described above comprising:

injecting a first injection fluid material through the nozzle of the apparatus, injecting a second injection fluid material through the nozzle of the apparatus.

In another aspect of the invention there is provided a method of purging an injection nozzle employing an injection molding apparatus (10) comprised of an injection molding machine (20), a heated manifold (30) that receives an injection fluid material (23) from the injection molding machine (20), a nozzle (50) having a fluid flow channel (300) having a longitudinal axis A and an upstream end (50*u*) that receives the injection fluid material (23) from the heated manifold (30) and delivers the injection fluid to a downstream end (50*d*) that sealably delivers the injection fluid (23) to a gate (85) of a cavity (80) of a mold body (88), wherein the downstream end (50*d*) of the nozzle (50) comprises an inner tubular member (55) having an outer circumferential surface (55*es*) and an outer tubular member (56) having an inner tubular surface (56*is*), the outer tubular member (56) forming a seal (57, 86, 54, 58) surrounding the gate (85), wherein the inner (55) and outer (56) tubular members are adapted to form a sealed circumferential gap (G) between the outer circumferential surface (55*es*) of the inner tubular member (55) and the inner circumferential surface (56*is*) of the outer tubular member (56), the circumferential gap (G) circumferentially surrounding the fluid flow channel (300), wherein the inner tubular member (55) is adapted to include one or more apertures (500) extending radially (R) through the inner tubular member (55) between the fluid flow channel (300) and the circumferential gap (G) to enable flow of injection fluid (23) that is injected in an upstream to downstream direction or path of flow through the fluid flow channel (300) to flow radially (R) from the fluid flow channel (300) into the circumferential gap (G), wherein the circumferential gap (G) and the fluid flow channel (300) are adapted to communicate with each other downstream to form a common stream of flow (23*c*) of injection fluid material (23) that is routed to the gate (85), the method comprising:

controlling axial positioning of an outer surface (90*tcs*, 90*mds*) of the valve pin (90) relative to an inner surface (55*is*) of the inner tubular member (55) during the course of an injection cycle to form a flow restriction (UG) through the nozzle channel (300) for one or more predetermined amounts of time during the injection cycle sufficient to cause flow of fluid material (23) to be routed through an aperture (500) at an elevated rate of flow (GF) through the purge apertures (500) and the gap (G).

In another aspect of the invention there is provided a part or product formed by carrying out an injection cycle according to the methods described above.

In another aspect of the invention there is provided in an injection molding apparatus comprised of an injection molding machine 20 that injects an injection fluid material 23 into a heated manifold 30, a nozzle having a fluid flow channel 300 having a longitudinal axis A and an upstream end 56*u* that receives the injection fluid material 23 from the heated manifold 30 and delivers the injection fluid to a downstream end 50*d* that sealably delivers the injection fluid 23 to a gate 85 of a cavity 80 of a mold body 88, the downstream end 50*d* of the nozzle 50 comprising an inner tubular member 55 having an outer circumferential surface 55ES and an outer tubular member 56 having an inner tubular surface 56IS, the outer tubular member 56 sealably surrounding 57, 86, 54, 58 the gate 85, the inner 55 and outer 56 tubular members being arranged relative to each other such that a circumferential gap G is formed between the outer circumferential surface 55ES of the inner tubular member 55 and the inner circumferential surface 56IS of the outer tubular member 56, the circumferential gap G circumferentially surrounding the fluid flow channel 300, the inner tubular member 55 having one or apertures 500 extending radially R through the inner tubular member 55 between the fluid flow channel 300 and the circumferential gap G to enable flow of injection fluid 23 that is injected upstream to downstream through the fluid flow channel 300 to flow radially R from the fluid flow channel 300 into the circumferential gap G. The circumferential gap G is preferably adapted to route the flow of injection fluid downstream to the mold cavity 80.

The circumferential gap G and the fluid flow channel 300 are preferably adapted to communicate with each other downstream to form a common stream of flow 23*c* and route the injection fluid material 23 to the gate 85.

Preferably the one or more apertures 500 are configured to direct or route injection fluid 23 that is injected from the upstream end of the nozzle downstream through the fluid flow channel 300 and radially R and longitudinally A through the circumferential gap G The one or more apertures 500 typically have a flow axis AA that is configured and disposed at an acute angle X to the longitudinal axis A of the fluid flow channel 300 of the nozzle 50 that is adapted to route the fluid material 23 radially R in a downstream axial A direction through the gap G toward the gate 85.

The apparatus typically further comprises a controller 16 having a program that contains instructions that control axial positioning of an outer surface 90*tcs*, 90*mds* of the valve pin 90 relative to an inner surface 55*is* of the inner tubular member 55 to form a flow restriction UG through the nozzle channel 300 for one or more predetermined amounts of time during the course of an injection cycle sufficient to cause flow of fluid material 23 to be routed through an aperture 500.

The inner tubular member 55 is preferably mounted within and circumferentially surrounded by the outer tubular member 56 at the distal end of the nozzle 50*d*, the inner tubular member 55 having an outer circumferential mating surface 54 that is sealably engaged against an inner seal surface 58 of the outer tubular member 56 to seal against upstream flow of the injection fluid material 23 through the gap G.

The outer tubular member 56 typically has an exterior seal surface 57 sealably engaged against a mold body seal surface 86 to seal against upstream flow the injection fluid material through the gap G.

The inner tubular member 55 is mounted and nested within the outer tubular member 56 in an arrangement that seals injection fluid material against upstream flow through the gap G.

The apparatus can further comprise a controller 16 containing instructions that direct withdrawal of the valve pin 90 upstream from a gate closed position at one or more reduced rates of travel relative to a maximum rate of travel upstream to one or more partially gate open positions.

And the controller 16 can contain instructions that direct withdrawal of the valve pin 90 from a gate closed position upstream to one or more partially gate open positions that restrict fluid material 23 flow to a rate less than a maximum rate for one or more predetermined periods of time and subsequently upstream to a fully gate open position.

In another aspect of the invention there is provided a method of purging the injection nozzle 50 of an apparatus 10 described immediately above comprising:

injecting a first injection fluid material through the nozzle of the apparatus, injecting a second injection fluid material through the nozzle of the apparatus.

BRIEF DESCRIPTION OF THE DRAWINGS

The above and further advantages of the invention may be better understood by referring to the following description in conjunction with the accompanying drawings in which.

DETAILED DESCRIPTION

Figure 1:
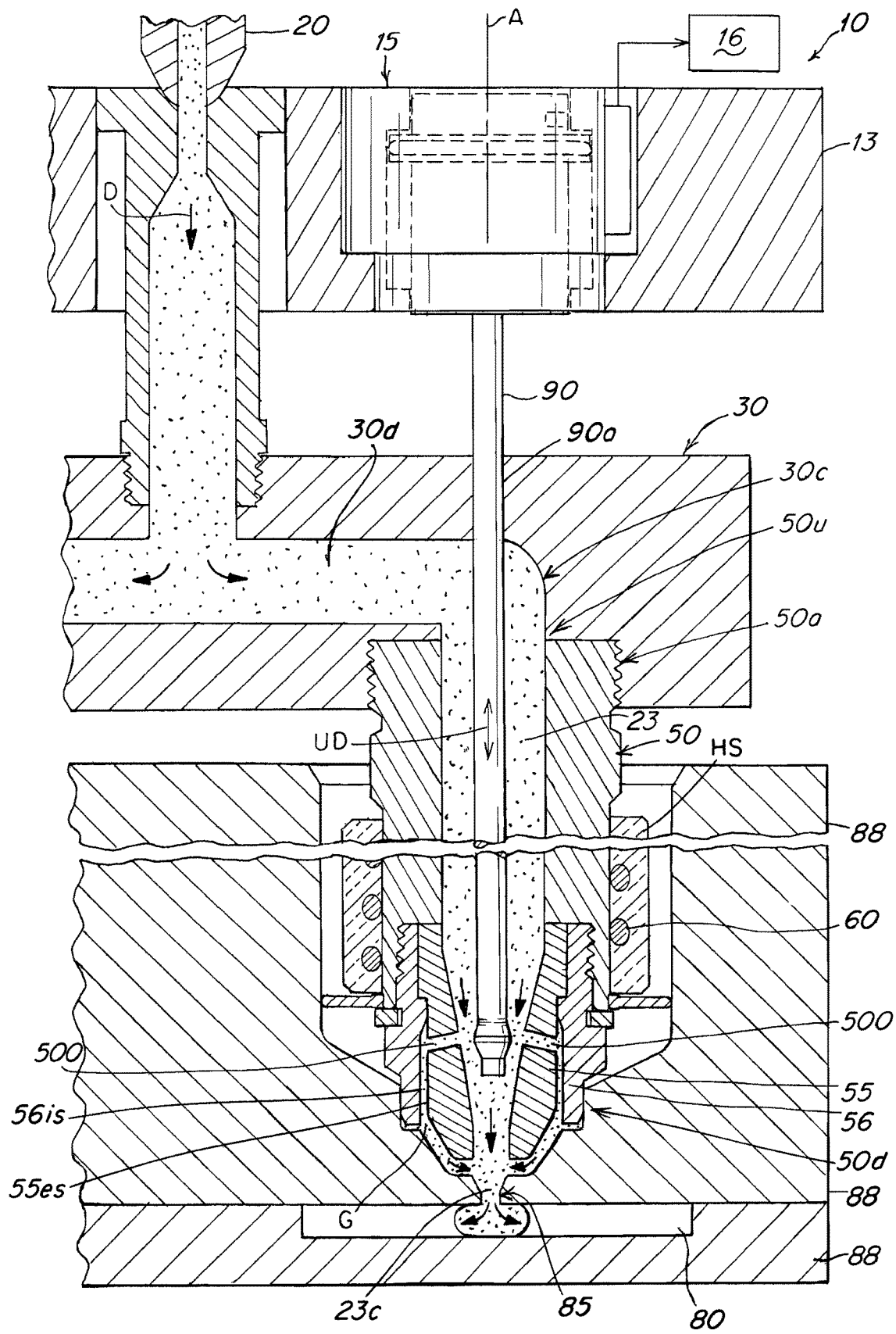
FIG. 1 is a cross-sectional view of an injection molding machine, hotrunner or heated manifold, nozzle and mold body according to one embodiment of the invention.
Figure 2:
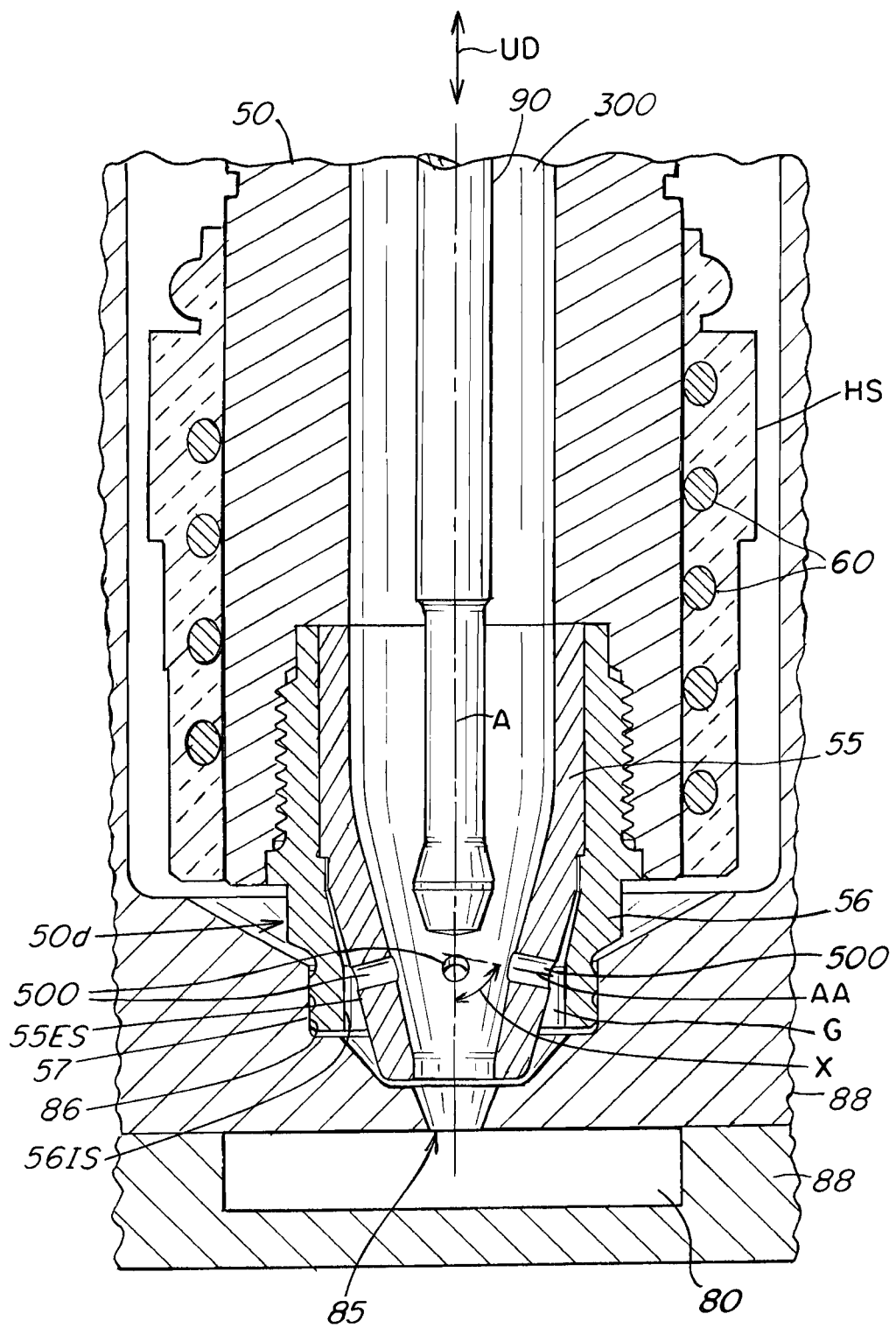
FIG. 2 is a schematic cross-sectional view of the distal end of a preferred embodiment of nozzle insert and valve pin.
Figure 2A:
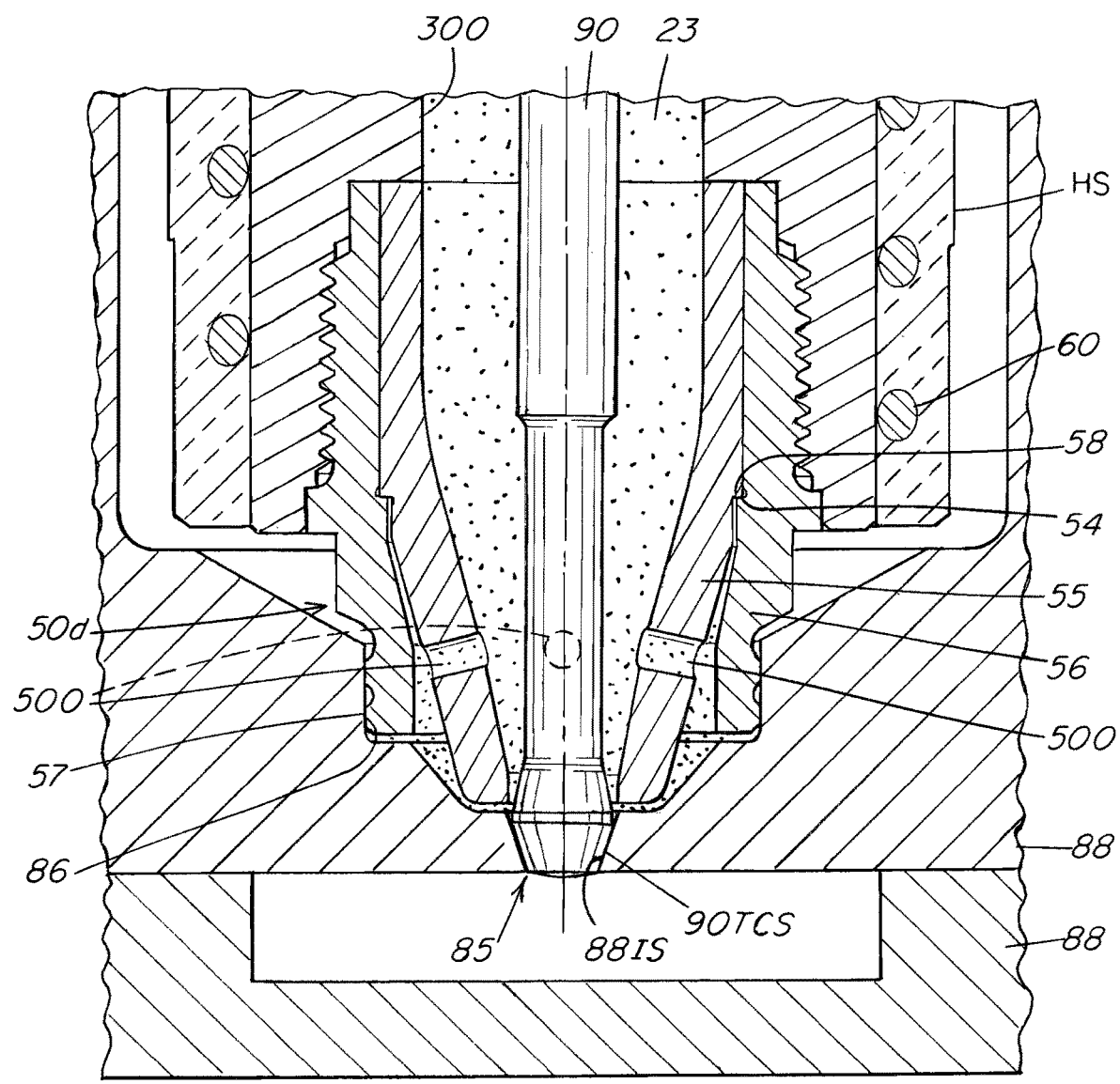
FIG. 2A is a schematic cross-section view of the nozzle insert and valve pin of FIG. 2 in a fully closed position.
Figure 5:
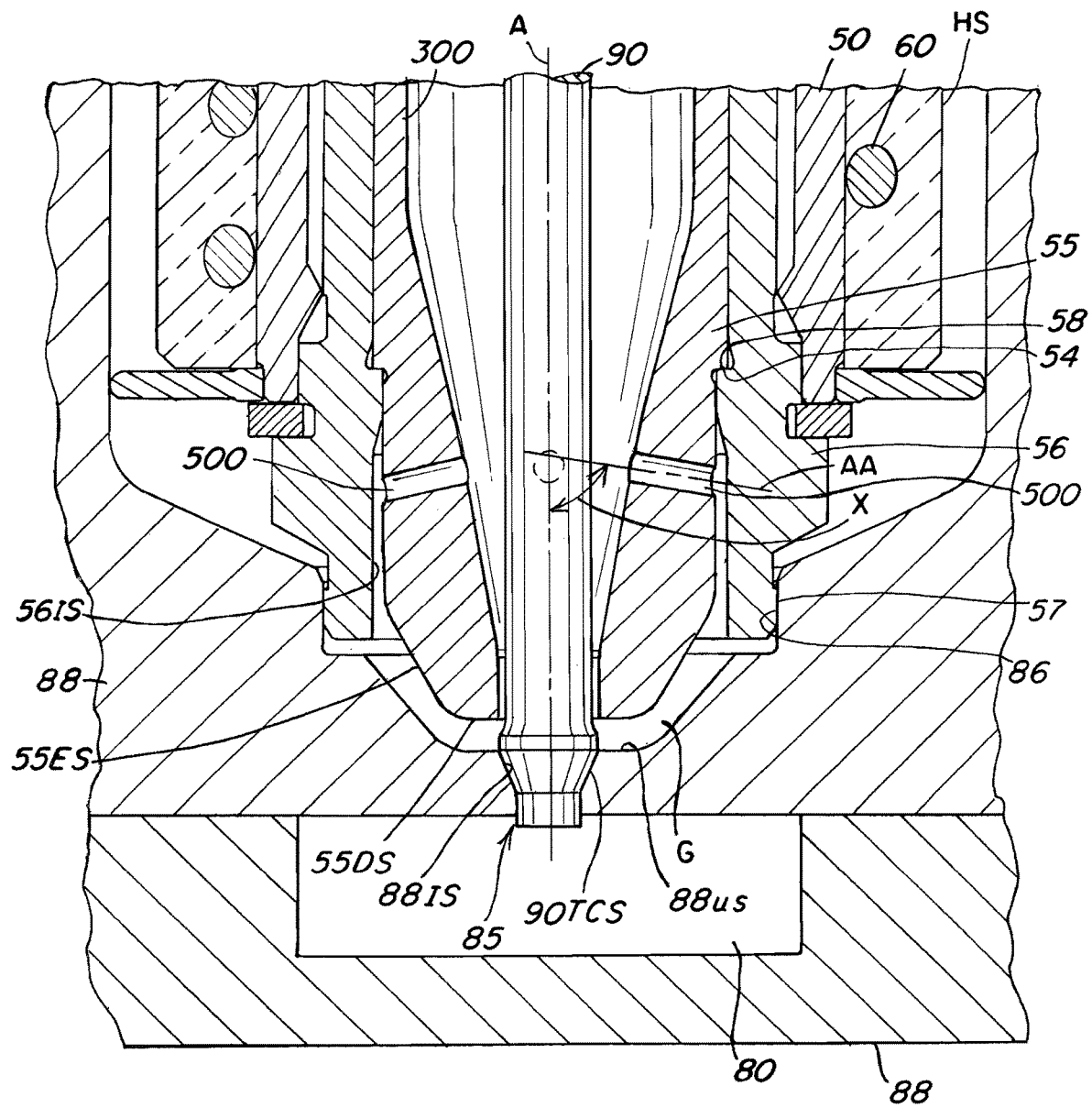
FIG. 5 is a schematic cross-sectional view of an alternate embodiment similar to FIG. 1 but with an elongated insert.
Figure 6:
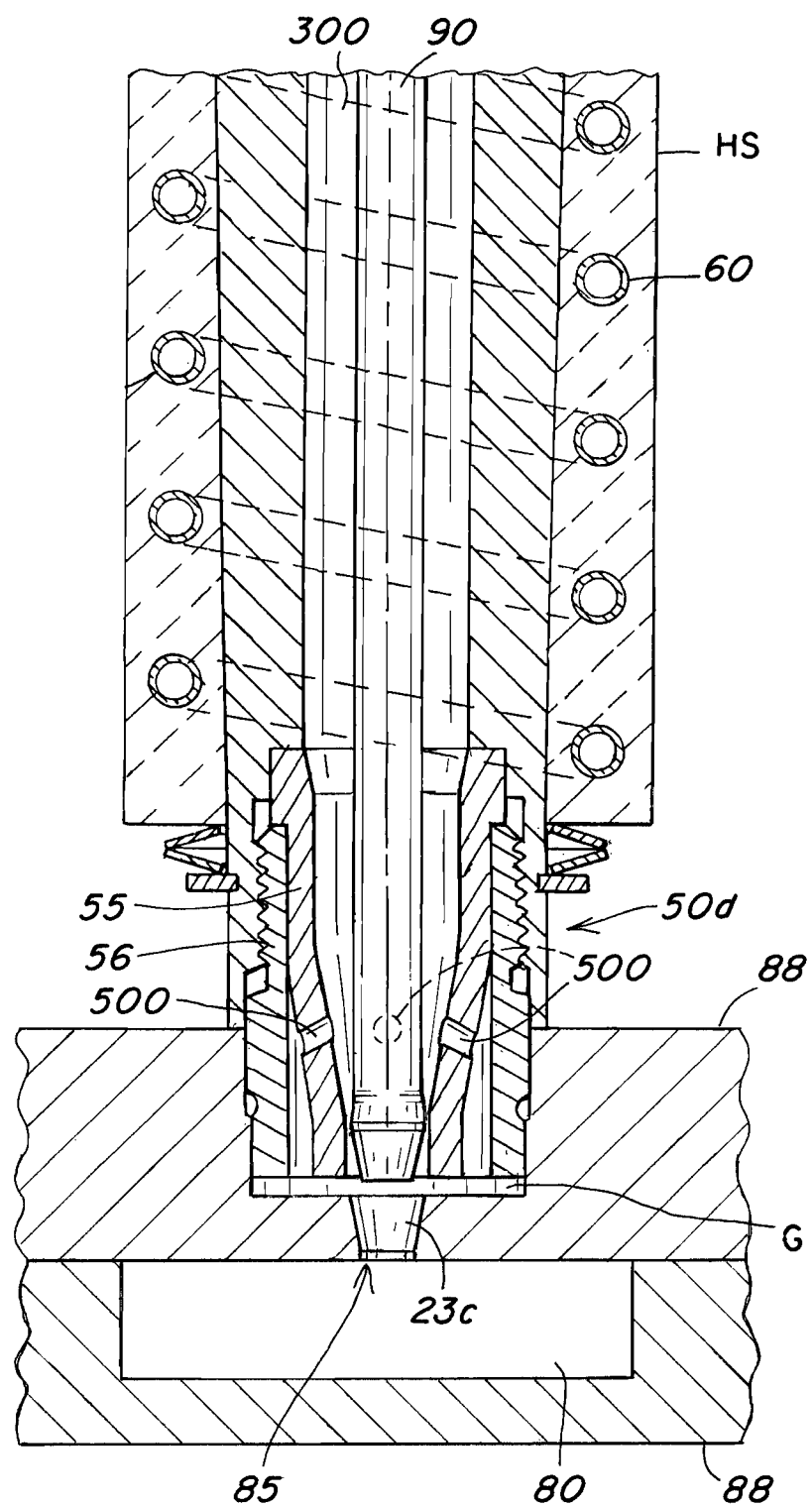
FIG. 6 is a schematic cross-sectional view of an alternate embodiment of a nozzle which extends longitudinally toward and in engagement with the mold body.

FIGS. 1-6 show various embodiments of an apparatus 10 and nozzle 50 according to the invention. The apparatus typically comprises a top clamp plate 13, an actuator 15 that reciprocally drive an interconnected valve pin 90 in an upstream-downstream path UD between gate open positions such as shown in FIGS. 1, 2, 2B, 2C and gate closed positions such as shown in FIGS. 2A, 5. The valve pin 90 is preferably arranged such that the valve pin is mounted within a guide aperture 90a that extends through a hotrunner or heated manifold 30 and further extends through a fluid material 23 flow channel 30c that is disposed within the heated manifold 30. The nozzle 50 sealably interconnects the manifold flow channel 30c with a central nozzle flow channel 300. The apparatus 10 typically includes a controller 16 that controls the upstream-downstream UD movement of the valve pin 90 during the course of an injection cycle according to a predetermined algorithm or program.

The injection machine 20 injects fluid material 23 under pressure in a downstream direction D into the fluid distribution channels 30d of the heated manifold 30. The fluid material 23 is routed further downstream through downstream manifold channel 30c and further downstream into and through the nozzle channel 300 eventually to and through gate 85 into mold cavity 80. As described below, some portion of the fluid material 23 travelling downstream through nozzle channel 300 is routed through lateral nozzle apertures 50 and gap G during the course of downstream flow to and through the gate 85.

The apparatus 10 includes a mold body 88 having a gate 85 with which the travel or drive axis A of the nozzle 50 is typically coaxially aligned. The distal end 50d of the nozzle 55 includes an inner tubular member or insert 55 typically comprised of a highly heat conductive material. The insert 55 is typically mounted and nested within an outer tubular member 56 that radially surrounds the gate 85 and forms a fluid seal via compression between an outer circumferential mating surface 57 that mates with a complementary inner mating surface 86 of the mold body 88 to prevent injection fluid from flowing upstream around the outside surface of the outer tubular body 56.

Figure 3:
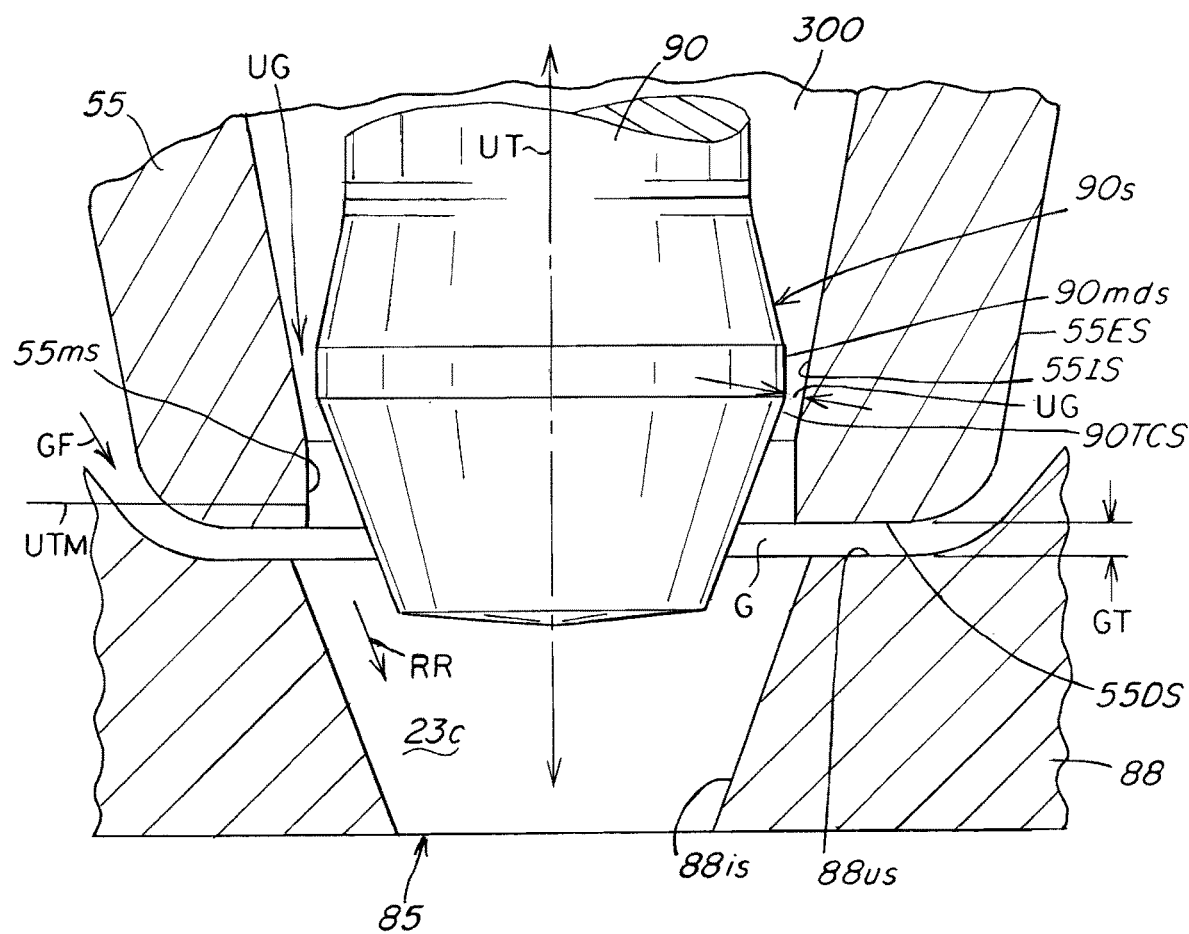
FIG. 3 is an enlarged detail view of a portion of FIG. 2B showing the relative size of the gaps between the valve pin the nozzle insert and the nozzle part and mold body the valve pin is at 3 mm open.
Figure 4:
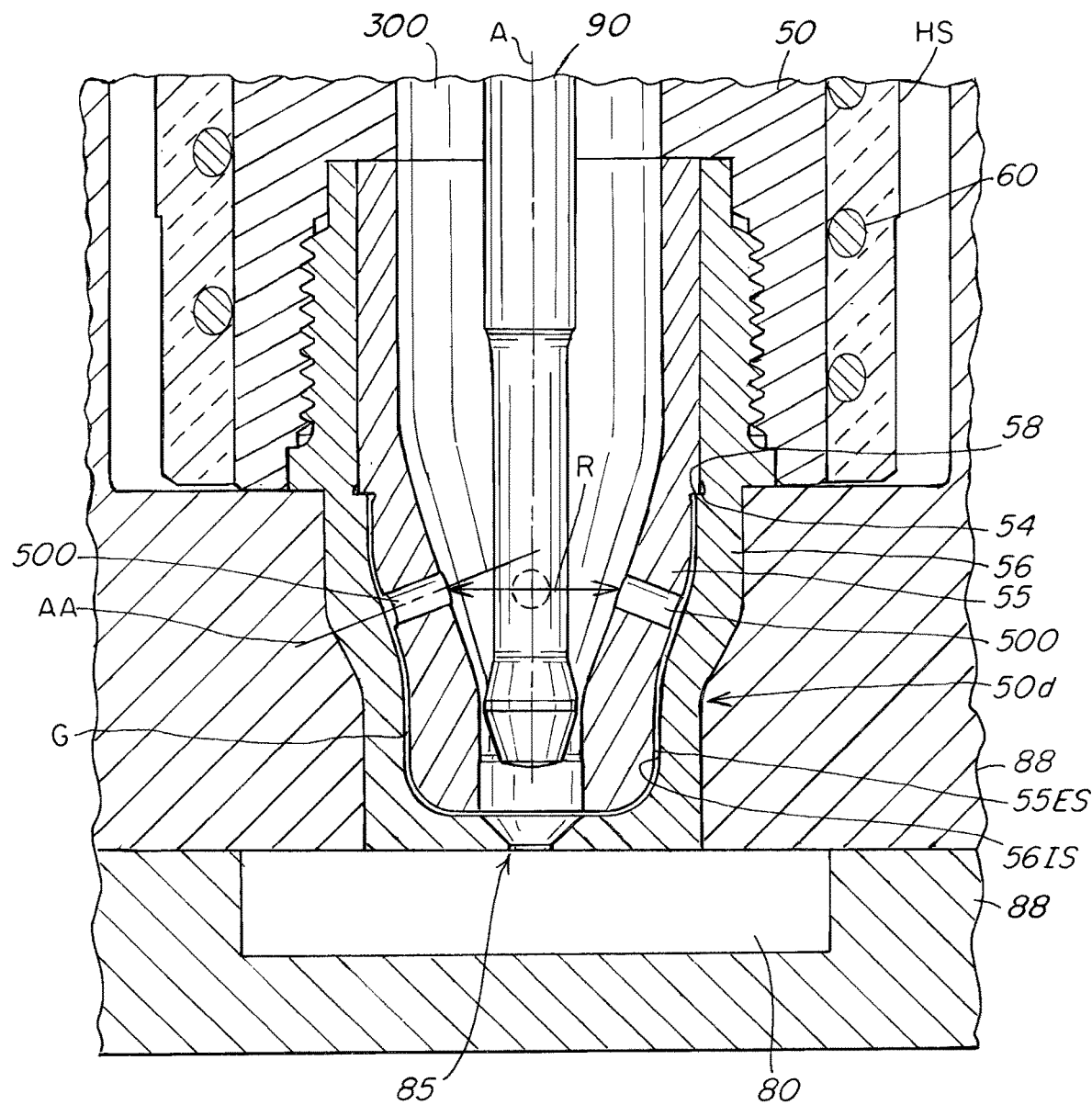
FIG. 4 is a schematic cross-sectional view of an alternate embodiment where the outer tubular member extends longitudinally toward and into engagement with the mold body.

The outer tubular member 56 is mounted against the mold body 88 via the mating surfaces 57, 86 and the inner tubular member or insert 55 is mounted and arranged via mating of an outer circumferential surface 54 against an inner mating surface 58 of the outer tubular member such that a gap G is formed between the outer circumferential surface 55es of the inner tubular member 55 and the inner surface 56IS of the outer tubular member. In the embodiments shown in FIGS. 1-6, the distal end surface 55ds of the inner tubular member 55 is spaced apart from the mold body 88 such that the member 55 does not engage or contact the mold body 88 in a manner that results in heat conductive contact. As shown in FIGS. 3, 5 the distal end surface 55ds is spaced a selected gap distance GT of typically between about 0.04 mm and about 0.1 mm from the upstream facing surface 88us of the mold body. The gap G that is disposed between the outer surface 55es and the inner surface 56is communicates with the gap G disposed between the distal tip end surface 55ds and the mold surface 88us such that injection fluid 23 that flows downstream through the nozzle channel 300 to the gate 85 during any given injection cycle can seep through the distal-most portion of the gap G upstream into the larger portion of the gap G that is disposed between the outer surface 55es and the inner surface 56is.

Residual injection fluid 23 that has seeped into gap G can be flushed or purged out of the gap G by running one or more additional or subsequent purge injection cycles that are separate from normal operational injection cycles. On running such additional or subsequent cycles the injection fluid will travel though apertures 500 along both a lateral or radial R and along a longitudinal A direction on account of the configuration of the apertures 500 having both a lateral R and longitudinal profile with an axis AA that is disposed at an acute angle X to the longitudinal axis A of the nozzle channel 300 that is adapted to route the injection fluid radially R and in a downstream axial A direction through the gap G toward the gate 85.

Figure 2B:
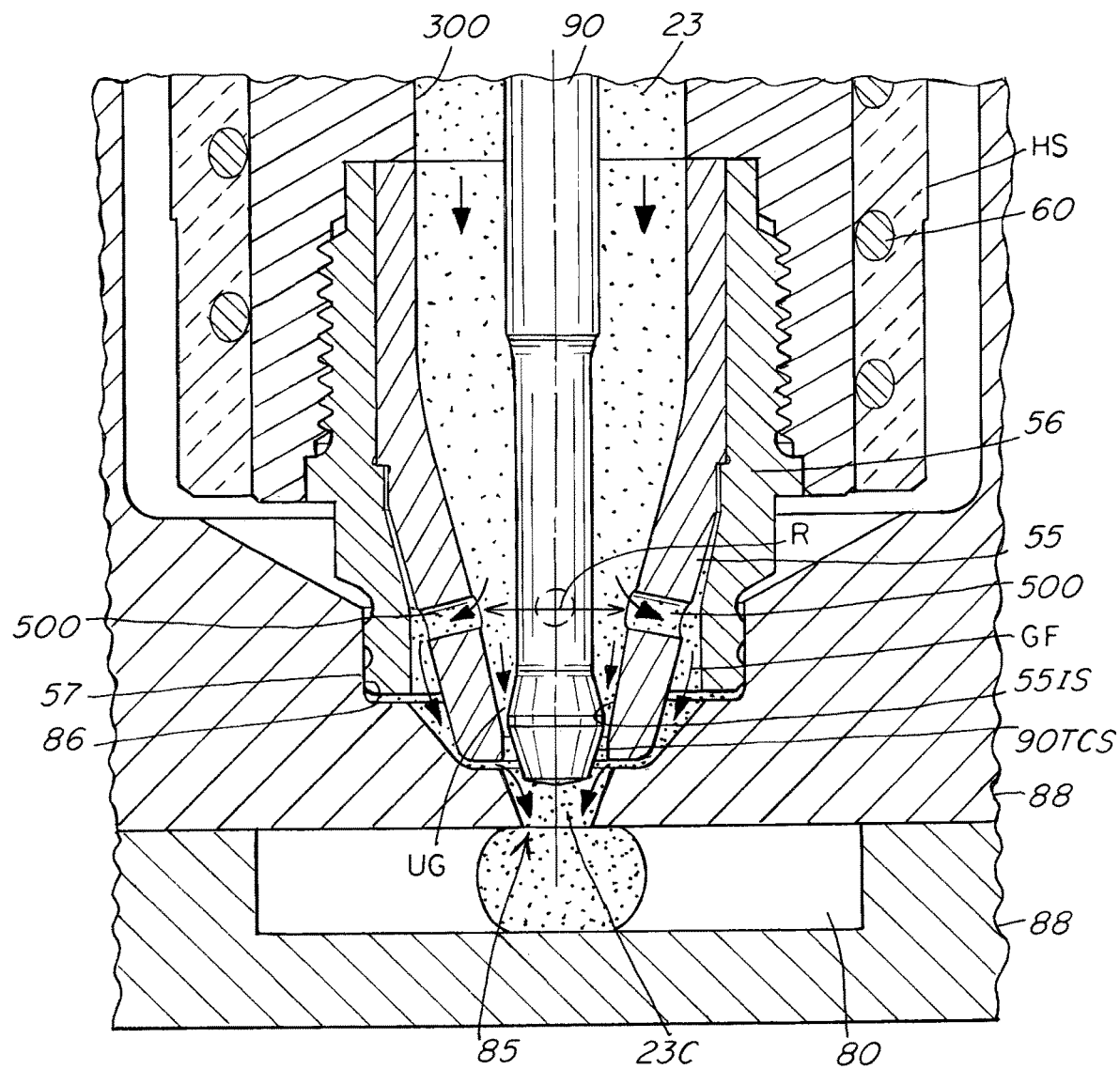
FIG. 2B is a schematic cross-sectional view similar to FIG. 2A but showing the valve pin in an initially upstream partially open position
Figure 2C:
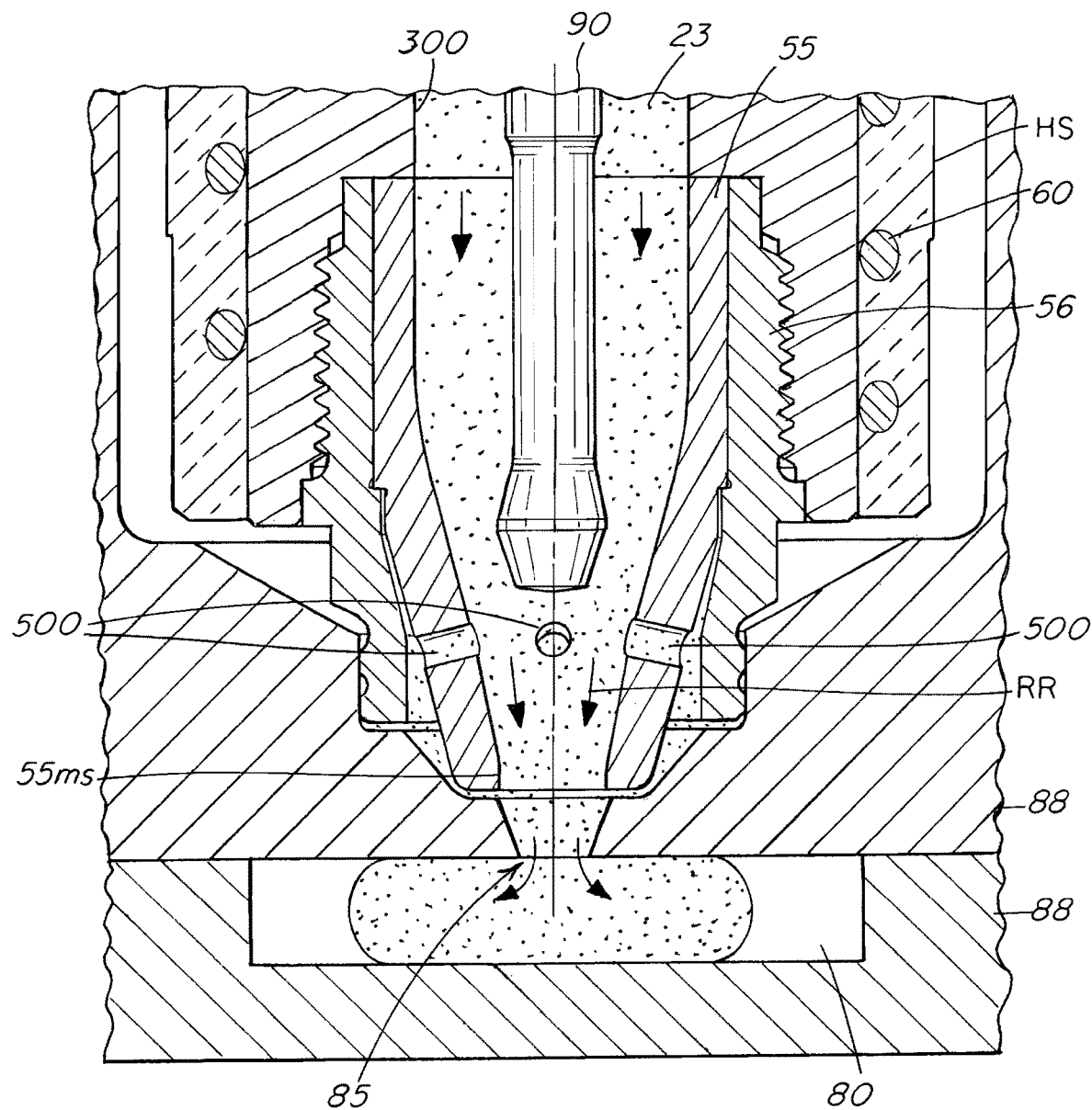
FIG. 2C is a schematic cross-sectional view similar to FIG. 2B but showing the valve pin in a fully open position.

In one embodiment of the invention, the valve pin 90 can be controllably withdrawn upstream beginning from a gate closed position to a position of upstream travel UT such as shown in FIGS. 2B, 3 where the outside surface of the pin 90 restricts UG flow of injection fluid through the main nozzle channel 300 but better enables a higher volume and rate of injection flow through the purge apertures 500. When the pin 90 is disposed in such a position such as in FIGS. 2B, 3 where the pin forms a restriction gap UG (typically between about 0.05 and about 0.5 mm) fluid flow RR longitudinally through the interior of the channel 300 is restricted to a rate that is substantially less than the unrestricted flow rate, velocity or volume that would normally occur under full system pressure when the pin 90 is not restricting flow through channel 300. The injection fluid 23 that is injected into the channel 300 is still injected under the same pressure and although flow is restricted longitudinally RR through the channel 300, flow of fluid GF is diverted radially R under a higher rate through purge apertures 500 and downstream GF through gap G. Thus when running a purge cycle of injection fluid subsequent to a prior cycle, the valve pin 90 is preferably withdrawn from a fully gate closed position upstream at a rate of upstream travel that disposes the selectively formed distal portion 90*p* of the pin 90 at an upstream position of travel UT for a preselected period of time that causes the flow of injection fluid to be restricted through channel 300 and to be diverted radially R at an elevated rate of flow GF through the purge apertures 500 and the gap G.

In the gate closed position shown in FIGS. 2A, 5, the outer surface 90*tcs* of the pin 90 engages with the inner surface 88*is* of the gate area to completely surround and seal the gate such that flow R, RR of injection fluid is completely stopped. The pin 90 can be controllably withdrawn upstream beginning from the gate closed position as shown in FIGS. 2B, 3 to any selected one or more axial upstream-downstream positions UT at which the interior surface 88*is* of the gate forms a flow restriction gap downstream at the gate between the surface 88*is* and the outer surface 90*tcs* of the pin 90.

Similarly the pin 90 can be controllably withdrawn upstream beginning from a position as shown in FIGS. 2B, 3 to any selected one or more axial upstream-downstream positions UT at which the interior surface 55*is*, 55*ms* of the inner tubular member 55 and the complementary outer circumferential surface 90*tcs* form an upstream restriction gap UG for any desired period of time.

In one embodiment, the pin 90 can be withdrawn and held stationary at one or more axial positions UT along the axial A up and down UD course of travel of the pin 90 such that the pin 90 is disposed in one or more upstream restriction positions UG for some selected period of time such as from about 0.1 to about 10 seconds depending on the normal length of the injection cycle.

In one embodiment the valve pin 90 can be provided with a maximum downstream diameter section 90*s* that has an outer circumferential surface 90*mds* that is complementary to and mates with a complementary interior mating surface 55*ms* of the inner member 55 such that fluid material 23 flow through channel 300 is stopped or substantially reduced when the surfaces are axially aligned along axis UTM thus forcing downstream flow D of fluid material 23 to flow through apertures 500 and gap G thus flushing out gap G. Such a flushing is typically carried out at the beginning or at the end of an injection cycle via running a separate flush cycle, or can be carried out during the course of an injection cycle for a selected period of time. Alternatively, the diameter of the maximum diameter surface 90*mds* can be selected to be less than the diameter of the complementary surface 55*ms* such that the two surfaces do not mate, but rather are closely similar in size such that a restriction flow gap UG is formed of such a size that downstream flow through the gap UG is substantially restricted when the surfaces are axially aligned along axis UTM or approach becoming axially aligned along axis UTM.

As the valve pin 90 is driven either downstream or upstream to a position where the maximum diameter surface 90*mds* is approaching axial alignment with the complementary surface 55*ms*, the flow restriction gap UG begins to form thus causing the flow of fluid 23 to be restricted in its volume and rate of flow downstream D through channel 300 thus also causing pressurized downstream flowing fluid 23 to be routed through apertures 500. Such restricted rate or volume of flow during the course of an injection cycle, can be predetermined and controlled so as to adjustably control the rate and volume of flow of injection fluid 23 to and through the gate and into the mold cavity 80.

The controller 16 can be provided with a program that contains instructions that control the axial positioning of the surfaces 55*is* and 90*mds* relative to each other during the course of travel of the valve pin 90 such that a flow restriction UG is formed for any predetermined amount of time during the course of an injection cycle sufficient to cause fluid material 23 flow to be directed or routed through apertures 500 at a selected degree of flow.

The controller 16 can be provided with a program containing instructions that control the precise axial positioning of the valve pin 90 so as to control the size of a restriction gap between surfaces 88*is* and 90*tcs* at the gate. By controlling the size of the restriction gap, the rate and volume of flow of injection fluid to and through the gate 85 can be controlled during the course of an injection cycle.

Typically the rate of withdrawal of the valve pin 90 beginning from the fully closed position at the beginning of an injection cycle toward a fully gate open flow unrestricted position is carried out such that the valve pin is initially withdrawn at a reduced rate of withdrawal relative to a maximum rate of withdrawal at which the actuator is capable of driving the valve pin for a selected period of time so as to effect a rate of injection fluid flow at the beginning of an injection cycle that is less than the maximum flow rate which occurs when the valve pin is withdrawn to a position where fluid flow is unrestricted and at a maximum. Such initial reduced rate of pin withdrawal is typically selected to be at a rate and for a period of time sufficient to avoid, remove, obviate, reduce or lessen the occurrence of a blemish, artifact, overload or overpressure of injection fluid passing through the gate area at the beginning of an injection cycle. Thus the apparatus can further comprise a controller 16 containing instructions that direct withdrawal of the valve pin 90 upstream from a gate closed position at one or more reduced rates of travel relative to a maximum rate of travel upstream to one or more partially gate open positions. And the controller 16 can contain instructions that direct withdrawal of the valve pin 90 from a gate closed position upstream to one or more partially gate open positions for one or more predetermined periods of time and subsequently upstream to a fully gate open position.

Alternatively the pin 90 can be controllably withdrawn upstream at a series of variable rates or positions that follow a predetermined profile of pin positions or pin velocities versus time of withdrawal.

In the embodiments shown in FIGS. 1-6, the apparatus 5 can include a heater sleeve HS disposed around and in heat conductive engagement with the outside surface of the nozzle 50, the sleeve including heater coils 60 typically disposed within the body of the sleeve HS.

What is claimed is:

1. An injection molding apparatus comprised of an injection molding machine that injects an injection fluid material into a heated manifold,
    a nozzle having a fluid flow channel having a longitudinal axis A and an upstream end that receives the injection fluid material from the heated manifold and delivers the injection fluid material to a downstream end that sealably delivers the injection fluid material to a gate of a cavity of a mold body,
    the downstream end of the nozzle comprising an inner tubular member having an outer circumferential surface and an outer tubular member having an inner tubular surface, the outer tubular member forming a seal surrounding the gate, the inner and outer tubular members being adapted to form a sealed circumferential gap G between the outer circumferential surface of the inner tubular member and the inner circumferential surface of the outer tubular member, the circumferential gap G circumferentially surrounding the fluid flow channel, a valve pin being disposed within the fluid flow channel, the inner tubular member has one or more apertures extending radially through the inner tubular member between the fluid flow channel and the circumferential gap G to enable flow of the injection fluid material that is injected in an upstream to downstream path of flow through the fluid flow channel to flow radially from the fluid flow channel into the circumferential gap G, the valve pin having a maximum downstream diameter section that has an outer circumferential surface that is complementary to and mates with a complementary interior mating surface of the inner tubular member such that the injection fluid material is stopped or substantially reduced when the complementary surfaces are axially aligned forcing flow of the injection fluid material to flow through the one or more apertures and the circumferential gap G, a controller having a program that contains instructions that control axial positioning of the outer circumferential surface of the valve pin relative to an inner surface of the inner tubular member to form a flow restriction UG through the nozzle channel for one or more predetermined amounts of time during the course of an injection cycle sufficient to cause flow of the injection fluid material to be routed at an elevated rate of flow through the one or more apertures and the circumferential gap G.

2. An apparatus according to claim 1 wherein the one or more apertures are configured to direct or route the injection fluid material that is injected from the upstream end of the nozzle downstream through the fluid flow channel and radially and longitudinally through the circumferential gap G.

3. An apparatus according to claim 1 wherein the one or more apertures have a flow axis that is configured and disposed at an angle to the longitudinal axis A of the fluid flow channel of the nozzle that is adapted to route injection fluid radially and in a downstream axial direction through the circumferential gap G toward the gate.

4. An apparatus according to claim 1 wherein the inner tubular member is mounted within and circumferentially surrounded by the outer tubular member at the distal end of the nozzle, the inner tubular member having an outer circumferential mating surface that is sealably engaged against an inner seal surface of the outer tubular member to seal against upstream flow of the injection fluid material through the circumferential gap G.

5. An apparatus according to claim 1 wherein the outer tubular member has an exterior seal surface sealably engaged against a mold body seal surface to seal against upstream flow the injection fluid material through the circumferential gap G.

6. An apparatus according to claim 1 wherein the inner tubular member is mounted and nested within the outer tubular member in an arrangement that seals the injection fluid material against upstream flow through the circumferential gap G.

7. An apparatus according to claim 1 further comprising a controller containing instructions that direct withdrawal of the valve pin upstream from a gate closed position at one or more reduced rates of travel relative to a maximum rate of travel upstream to one or more partially gate open positions.

* * * * *